Figure 1:
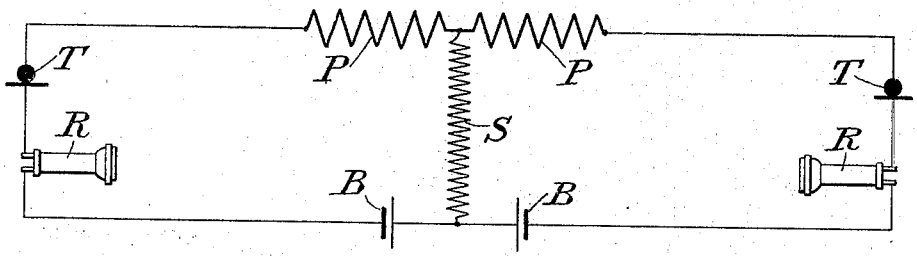

No. 641,005. Patented Jan. 9, 1900.
S. B. FOWLER.
TELEPHONY.
(Application filed Jan. 7, 1899.)

(No Model.)

Attest:
A. N. Jestera.
John M. Scoble.

Inventor:
Samuel B. Fowler
by Redding, Kiddle & Greeley
Attys.

UNITED STATES PATENT OFFICE.

SAMUEL B. FOWLER, OF TARRYTOWN, NEW YORK.

TELEPHONY.

SPECIFICATION forming part of Letters Patent No. 641,005, dated January 9, 1900.

Application filed January 7, 1899. Serial No. 701,437. (No model.)

*To all whom it may concern:*

Be it known that I, SAMUEL B. FOWLER, a citizen of the United States, residing in Tarrytown, in the county of Westchester, State of New York, have invented certain new and useful Improvements in Telephony, of which the following is a specification, reference being had to the accompanying drawings, forming a part hereof.

This invention relates to the production and transmission of electrical impulses or vibrations of the electric current by which sound-waves directed into a transmitter are made audible through a receiver at a more or less distant point and is concerned with the production of the said impulses or variations which are transmitted over the line from the one instrument to the other and with the arrangement of the circuits and of the instruments therein. It relates particularly to that form of telephony in which the source of primary or transmitter current is centralized at the telephone-exchange and in which the usual induction-coil may be located either in the cord-circuit at the exchange or at each station or instrument. One object aimed at in this invention is to divide the secondary or induced currents as they leave the secondary winding of the coils into two portions, one portion flowing through the receiving-circuit of one station and the other portion through the receiving-circuit of the other station. The advantage of thus dividing the induced current will be obvious when it is considered that the portion flowing through the circuit of the receiving-station has only the resistance of that circuit and not the resistance of both circuits, with their respective instruments, thus increasing the current flowing over the receiving-circuit. In that arrangement of my invention where the induction-coil is placed in the cord-circuit at the central office or exchange the induced or secondary current flows to the receiving-station, not over the whole length of the line between the two stations, but only over that part of it from the exchange-switchboard to its respective station. In either arrangement of coils—that in the cord-circuit or that in the subscriber's station—the secondary current flowing from the coil to either station is not compelled to pass through any of the circuit of the other instrument and is therefore not weakened by the retarding effects of any of the coils of the station where the party is talking. To effect this dividing of the induced current, the secondary of the coil is bridged across the circuit, and the secondary is wound so as to have a very low resistance and at the same time to have high retardation effects compared with the winding of the receiver-coils, for purposes that will be explained hereinafter. The difference of potential between the terminals of the secondary placed as described is as great as in the present arrangement of local-battery instruments, where the difference of potential must force current through the line to the receivers and the secondary of the coil at the other station all in series; but in the arrangement contemplated by this invention the induced current from the secondary flows over two circuits, either of which offers very much less retardation than in the form now commonly in use and mentioned above. The result is plainly a larger flow of current through each receiver and therefore louder transmission. Even where the location of the induction-coil is at the station and the induced current divides over circuits of very unequal length the loudness of transmission is extremely good, partly because of the large total amount of current generated and partly because in ordinary exchange working the retardation of the lines between stations is slight as compared with the retardation of the station-circuits, and therefore the inequality of the divided circuits is not as great as would at first seem. Another improvement in the arrangement of circuits as shown is the provision of a low-resistance circuit for the flow of the primary or transmitter battery.

Some of the arrangements of circuits and instruments in which the invention is capable of embodiment will be more particularly described hereinafter with reference to the accompanying drawings, in which—

Figure 2:
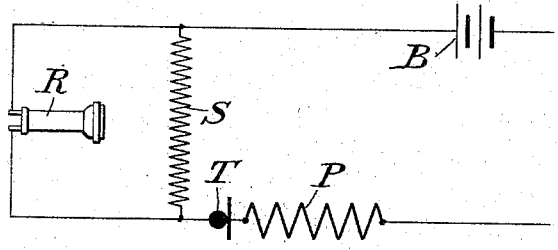
Figure 3:
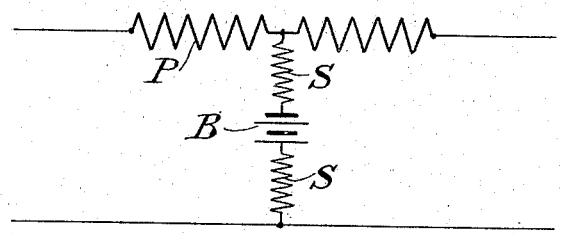

Figures 1 and 2 are diagrammatic views representing such different arrangements, and Fig. 3 is a similar view representing a modification in the disposition of the battery.

In the several figures of the drawings the several elements of a telephone system, so far as the same is concerned with the invention, are represented conventionally—the transmitter-battery at B, the primary and secondary of the induction-coil at P and S, respectively, whether the same are located at the central station or at the local station, the transmitter at T, and the receiver at R. It will therefore be unnecessary herein to make further reference to these several elements by letter.

In Fig. 1 the invention is shown as applied to a system in which the induction-coil is located in the cord-circuit at the exchange, two stations being shown. The secondary of the coil is bridged across the circuit, and the coil has two primary windings P, which are connected, one on each side of the secondary, in series on the line with its respective battery B, transmitter T, and receiver R. The secondary is wound to an extremely low resistance to provide a suitable path for the primary currents, but of sufficient retardation to afford practically no path for a secondary current on the line when compared with the retardation of the receiver-coils.

In Fig. 2 the invention is shown as applied to a system in which the induction-coil is located at the station, one station being shown and one portion of the battery. The battery arrangement would of course be the same as that shown in Fig. 1. The secondary in Fig. 2 is shown bridged across the circuit, the primary and transmitter placed between battery and secondary being in series with the receiver. The secondary is wound exactly as the one in Fig. 1 described above and for the same purpose.

It is obvious that the batteries shown in Fig. 1 could be combined and connected in series with the secondary and the combination bridged across the circuit, as represented in Fig. 3. It will also be evident that the invention is extremely flexible in its adaptation to existing systems, and it is to be understood that it is not to be limited to any particular arrangement of the circuits and instruments.

I claim as my invention—

A telephone system having the secondary of the induction-coil bridged across the line and the primary in series on the line, whereby the induced current is divided at the connection of the secondary with the line, one portion flowing in one direction over the line and the other portion in the other direction.

This specification signed and witnessed this 5th day of January, A. D. 1899.

SAMUEL B. FOWLER.

In presence of—
A. N. JESBERA,
F. M. EGGLESTON.